United States Patent [19]

Mizuno

[11] Patent Number: 5,318,238
[45] Date of Patent: Jun. 7, 1994

[54] PHOTOGRAPHIC FILM CASSETTE HAVING FILM GUIDE MEMBERS AND LIGHT-SHIELDING MEMBERS

[75] Inventor: Kazunori Mizuno, Kanagawa, Japan
[73] Assignee: Fuji Photo Film Co., Ltd., Kanagawa, Japan
[21] Appl. No.: 13,669
[22] Filed: Jan. 28, 1993

Related U.S. Application Data

[63] Continuation of Ser. No. 650,350, Feb. 4, 1991, abandoned.

[30] Foreign Application Priority Data

Feb. 2, 1990 [JP] Japan .................................. 2-24216
Jul. 5, 1990 [JP] Japan .................................. 2-177972

[51] Int. Cl.⁵ ............................................ G03B 17/26
[52] U.S. Cl. ........................................... 242/71.1
[58] Field of Search .................... 242/71, 71.1, 71.8, 242/71.9, 55.53, 71.7; 352/72, 75; 354/275, 277; 206/408, 409, 455

[56] References Cited

U.S. PATENT DOCUMENTS

| | | | |
|---|---|---|---|
| 2,336,278 | 12/1943 | Mihalyi | 354/214 |
| 2,360,255 | 10/1944 | Mihalyi | 242/71 |
| 2,364,381 | 12/1944 | Mihalyi | 242/71 |
| 2,521,935 | 9/1950 | Monroe | 242/71 |
| 2,552,200 | 5/1951 | Mihalyi | 242/71 |
| 3,128,058 | 4/1964 | Ringle et al. | 242/71.7 |
| 3,467,340 | 9/1969 | Rosenburgh | 242/197 |
| 3,556,435 | 1/1971 | Wangerin | 242/210 |
| 3,627,229 | 12/1971 | Wangerin | 242/210 |
| 3,627,230 | 12/1971 | Wangerin | 242/210 |
| 3,677,499 | 7/1972 | Wangerin | 242/210 |
| 3,797,777 | 3/1974 | Hosono et al. | 242/197 |
| 3,945,584 | 3/1976 | Mangan | 242/71.7 X |
| 4,380,382 | 4/1983 | Engelsmann et al. | 354/275 |
| 4,482,232 | 11/1984 | Engelsmann et al. | 242/71.1 X |
| 4,730,778 | 3/1988 | Akao et al. | 242/71.7 X |
| 4,832,275 | 5/1989 | Robertson | 242/71.1 |
| 4,834,306 | 5/1989 | Robertson et al. | 242/71.1 |
| 4,846,418 | 7/1989 | Fairman | 242/71.9 X |
| 4,875,637 | 10/1989 | Beach | 242/71.1 |
| 4,887,113 | 12/1989 | Niedospial, Jr. | 242/71.1 X |
| 4,928,826 | 5/1990 | Shibaraki et al. | 206/409 |
| 4,962,401 | 10/1990 | Takahashi | 354/275 |
| 5,003,334 | 3/1991 | Pagano et al. | 354/275 |
| 5,031,853 | 7/1991 | Jensen | 242/71.1 |
| 5,040,739 | 8/1991 | Wolf et al. | 242/71.1 |
| 5,046,679 | 9/1991 | Wolf et al. | 242/71.1 |
| 5,046,681 | 9/1991 | Niedospial | 242/71.1 |
| 5,048,770 | 9/1991 | Baxter et al. | 242/71.1 |
| 5,219,128 | 6/1993 | Mizuno | 242/71.1 |

FOREIGN PATENT DOCUMENTS

| | | |
|---|---|---|
| 1007615 | 5/1957 | Fed. Rep. of Germany ..... 242/71.1 |
| 2921379 | 11/1980 | Fed. Rep. of Germany . |
| 37-4453 | 3/1962 | Japan . |
| 37-21388 | 8/1962 | Japan . |
| 51-127737 | 11/1976 | Japan . |
| 53-105222 | 9/1978 | Japan . |
| 57-190947 | 11/1982 | Japan . |
| 57-190948 | 11/1982 | Japan . |
| 61-34526 | 10/1986 | Japan . |

Primary Examiner—Daniel P. Stodola
Assistant Examiner—John P. Darling
Attorney, Agent, or Firm—Sughrue, Mion, Zinn, Macpeak & Seas

[57] ABSTRACT

A photographic film cassette has two light trapping fabric pieces having pile threads, attached to respective upper and lower surfaces of the film passageway for trapping light. A ridge is formed on an inner surface of the cassette body for preventing the film from loosening. A ridge extended portion extends from the ridge toward the film passage mouth along the upper surface. The inclined portions are formed on both inner surfaces of the film passageway. The film leader is guided so as to be substantially between both fabric pieces during a film advance. A mechanism also is provided for shielding light in the passage through gaps between bottoms of the pile threads. In a further preferred embodiment, a recess is formed on the upper surface so that the lower surface is arranged in a position that is shifted upwardly by an amount corresponding to a depth of the recess, which reduces an angle at which light impinges on the coiled film. In yet another preferred embodiment, stepped portions or inclined portions are formed on the upper and lower surfaces. In a still further preferred embodiment, lateral walls of the film passageway are widely spaced near the film passage mouth to shield light in gaps beside the fabric pieces.

10 Claims, 15 Drawing Sheets

PHOTOGRAPHIC FILM CASSETTE HAVING FILM GUIDE MEMBERS AND LIGHT-SHIELDING MEMBERS

This is a continuation of application Ser. No. 07/650,350 filed Feb. 4, 1991, now abandoned.

BACKGROUND OF THE INVENTION

The present invention relates to a photographic film cassette, and more particularly to the construction of a film passageway in the cassette, through which film is advanced.

A photographic film cassette for containing 135-type film is the most widely-used of the various film cassettes. This film cassette is constituted by a light-tight cylindrical cassette body having a film passageway and a spool rotatably contained in the cassette body, the film being coiled around the spool.

Light trapping fabric, or "plush", is attached to the inner surfaces of the film passageway for trapping light entering the cassette body through a film passage mouth. There are various types of plush, including: woven fabric and pile threads woven therein, as described in Japanese Utility Model Publication 37-21388; knitted fabric and pile threads woven therein, as described in Japanese Utility Model Publication 61-34526; pile threads planted on the film passageway, as disclosed in Japanese Utility Model Publication 37-4453, and Japanese Patent Laid-Open Publications 53-105222 and 57-190947; and non-woven fabric, as disclosed in Japanese Utility Model Laid-Open Publication 51-127737.

In the film cassette most generally in use, a film leader of the film coiled in a roll protrudes from the film passage mouth. However, a film cassette with the entire film roll contained in the cassette body up to a leading end of the film has been proposed recently. In this film cassette, rotation of the spool causes the film to advance outside the cassette body toward a film take-up chamber in a camera so as to wind the film on a take-up spool in the chamber, as disclosed in U.S. Pat. No. 4,832,275 and 4,834,306.

There is also a recently-used film cassette having a plastic cassette body. In FIG. 28, illustrating an important portion of this film cassette, opposing lateral sides of a film passageway in a cassette body are defined by both lateral walls 140 and 141, between which light trapping fabric 142 is attached to both inner surfaces of the film passageway. If the light trapping fabric is not attached precisely, gaps might appear between the lateral ends of the light trapping fabric 142 and the lateral walls 140 and 141. There could be a problem in that fogging might be generated on photographic film 14 when external light is incident on the inside of the cassette body 56 through the gaps. A proposed film cassette for solving this problem, described in Japanese Patent Laid-Open Publication 57-190948, provides extra fabric for trapping light attached to both lateral walls of the film passageway.

However, the light trapping fabric is attached to the film passageway so as to press the film between both pieces thereof in a self-advancing film cassette described above, the light trapping fabric is considerably resistant to film advance. Thus, the light trapping fabric might bend the film in the cassette body, stop the film from advancing, and damage film surfaces.

The pile threads of the above-described light trapping fabric occupy a larger space at their tops but a smaller space at the bottom, because the bottoms are bunched. Light is trapped reliably at the middle between the upper and lower surfaces of the film passageway, but incompletely in the vicinity of the upper and lower surfaces. In FIG. 29, external light entering the inner surfaces of the film passageway might be incident on the outermost turn of the film 14 without being trapped by the light trapping fabric 142. If the form of the film passageway has a large angle $\Theta$ between the external light incident on the film 14 and the tangent of the outermost turn of the film 14, there is a problem in that the light incident on the coiled film 14 can cause fogging on a number of turns of the coiled film 14. Also, a film cassette as disclosed in Japanese Patent Laid-Open Publication 57-190948 is too expensive, because two different types of light trapping fabric are necessary.

SUMMARY OF THE INVENTION

In view of the foregoing, it is an object of the present invention to provide a photographic film cassette capable of guiding film smoothly to the film passage mouth to advance film without resistance of light trapping fabric.

It is another object of the present invention to provide a low cost photographic film cassette capable of shielding the film reliably from light in the passage through gaps involved in the light trapping fabric.

In order to achieve the above and other objects and advantages of this invention, the inventive photographic film cassette is constituted by first and second light trapping members, each provided on upper and lower surfaces of the film passageway, for trapping light, and structure for guiding the film leader to be close to a position defined between the first and second light trapping members when the film leader advances between the first and second light trapping members. According to a preferred embodiment, first fabric having pile threads is disposed on an upper surface of the film passageway for contact with an outside surface in a coiled state of the film, while second fabric having pile threads is disposed on a lower surface of the film passageway for contact with an inside surface in a coiled state of the film. According to another preferred embodiment, a ridge extended portion extends from a ridge formed on an inner surface of the cassette body to prevent the film from loosening toward the film passage mouth along the upper surface. According to still another preferred embodiment, resilient members are disposed on respective upper and lower surfaces of the film passageway, while pile threads are planted on a surface of the resilient members.

The film cassette further is constituted by surfaces which are inclined such that the width of the passageway increases in a direction toward the inside of the film cassette until reaching steps formed on both inner surfaces. The film cassette further is constituted by structure for shielding light in the passage through gaps between bottoms of the pile threads. According to a preferred embodiment, a narrowing of the film passageway is formed at the film passage mouth. According to another preferred embodiment, a light-shielding member projects obliquely from the lower surface toward the inside of the cassette body. According to a further preferred embodiment, a recess is formed on the upper surface in order to attach the first fabric to a position that is retracted from the film passageway, while the lower surface is arranged to have a short distance to the upper surface corresponding to a depth of the recess in order to reduce an angle at which light passed through gaps between bottoms of the pile threads impinges on the outer turns of the coiled film. According to yet another preferred embodiment, stepped portions are formed on each of the upper and lower surfaces. According to a still further preferred embodiment, steps are formed on lateral walls of the film passageway facing lateral edges of the film so as to widen the film passageway in the vicinity of the film passage mouth in order to shield light that is incident on gaps between the lateral walls and the fabrics.

In the film cassette according to the present invention, the film can be guided and advanced smoothly without resistance of light trapping fabric. The film can also be shielded reliably from light in the passage through gaps involved in the light trapping fabric in a low cost fashion without high friction between the film and the light trapping fabric during the film advance.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
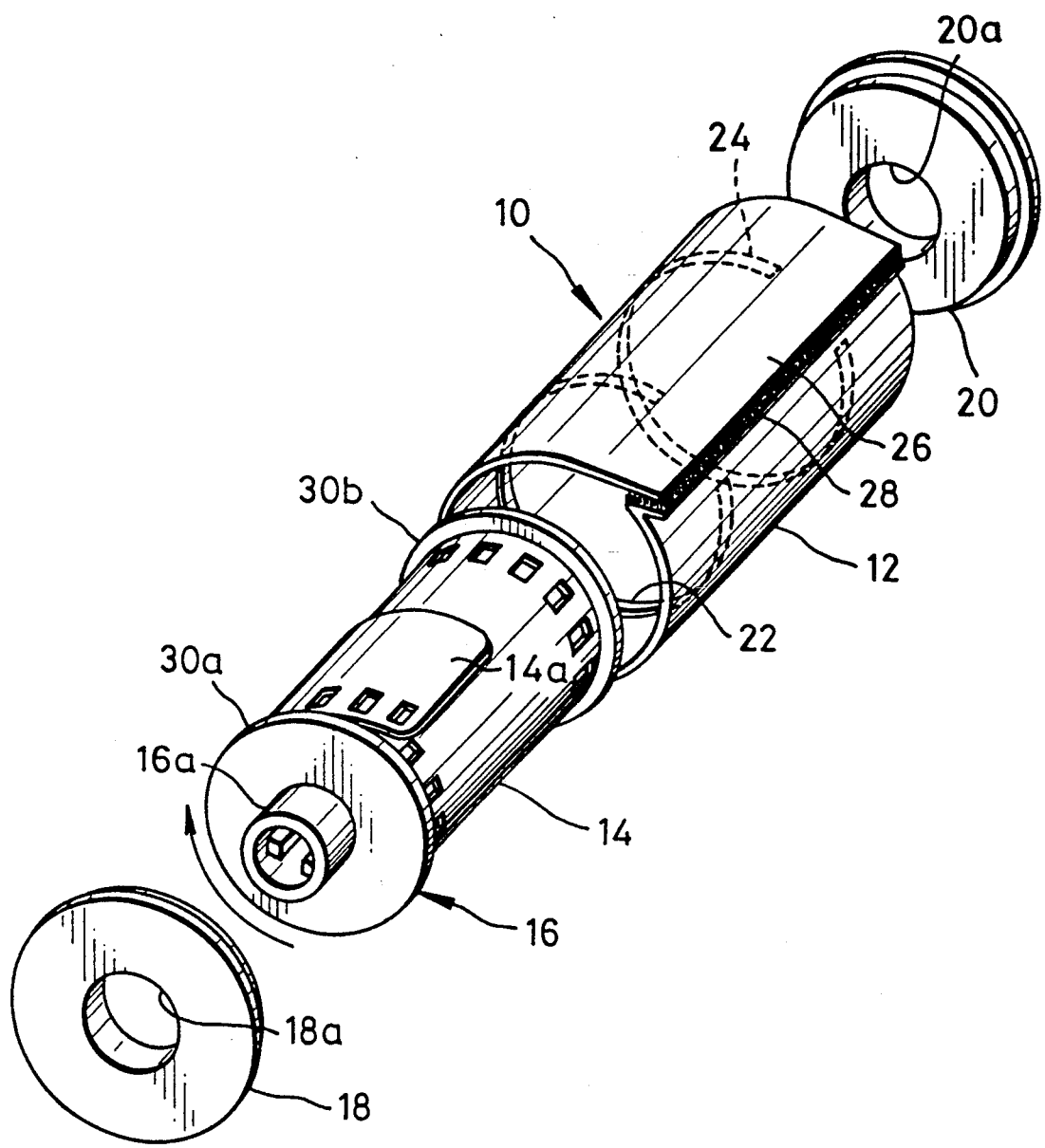
FIG. 1 is an exploded perspective view of the general construction of a photographic film cassette according to a preferred embodiment of the present invention.

FIG. 1 shows a photographic film cassette 10 according to a preferred embodiment of the present invention, the film cassette 10 consisting of a cassette shell 12, a spool 16 with photographic film 14, such as negative film, coiled thereabout, and cassette caps 18 and 20. The cassette shell 12 for containing the film 14 has two annular ridges 22 and 24 formed on its inner surface in order to reduce friction between the film 14 and the inner surface of the cassette shell 12.

Light trapping fabric 28 is attached on the upper and lower surfaces of a film passageway 26 in the cassette shell 12, in order to prevent light from entering the cassette shell 12. The light trapping fabric 28 is constituted of black-dyed velvet having rayon ground fabric with 75-denier warp thread and weft thread of 150 deniers, and 75-denier nylon pile threads. Other material also may be used for the ground fabric and the pile threads, including: synthetic fibers such as nylon, acrylic fibers, polyester, vinylon, vinyl chloride, vinylidene copolymer, polypropylene and polyethylene polycarbonate; and natural or regenerated fibers such as rayon, cupro-ammonium rayon, acetate, cotton and silk.

There are a number of methods for attaching the light trapping fabric 28 on the cassette shell 12. In one method, an adhesive agent is applied where the fabric is to be attached on the cassette shell 12, and then the light trapping fabric 28, cut in a predetermined size, is adhered thereto. In another method, sealer is applied to the light trapping fabric 28, and hot-melt adhesive agent is applied thereto. The fabric is cut in a predetermined size, placed in the position in which it is to be attached, and is attached in a fusion and reactivation method by means of heat, ultrasound, or high frequency energy. The light trapping fabric 28 also may be attached with sealer adhesive agent used for both the sealer and the adhesive agent, or double-coated adhesive tape, or by spot welding in the case of a plastic cassette shell.

The spool 16 has flanges 30a and 30b for supporting the film between both ends of the spool 16, and is rotated to advance the leading end 14a of the film 14 to the outside of the cassette shell 12. Bearing openings 18a and 20a are formed in each of the cassette caps 18 and 20 for receiving and supporting a spool shaft 16a.

Figure 2:
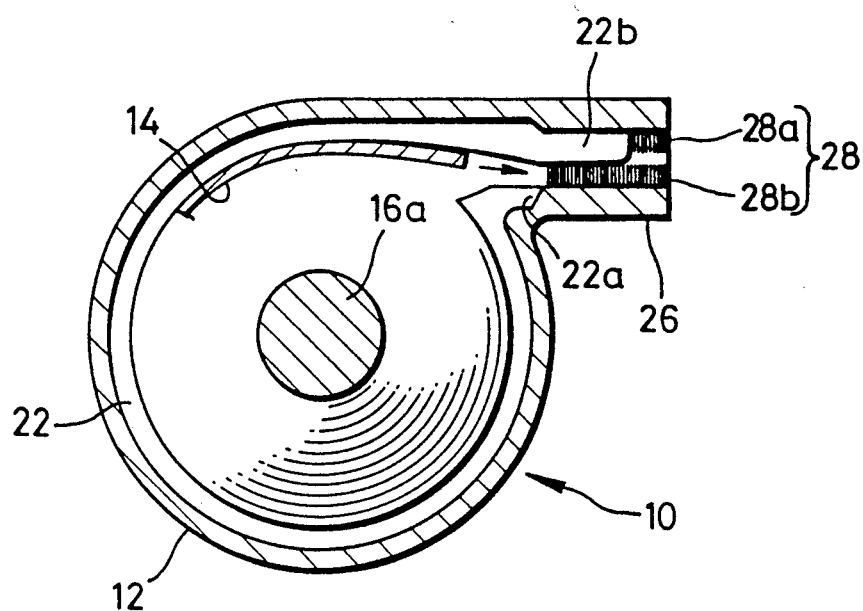
FIG. 2 is a sectional view of the inside of the film cassette of FIG. 1.
Figure 3:
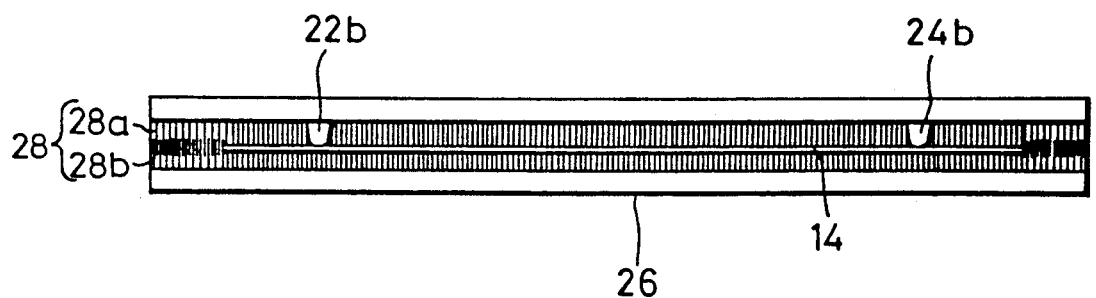
FIG. 3 is a front view of an important portion of the film cassette of FIG. 1.

FIGS. 2 and 3 show the inside of the film cassette 10 and the outside of the film passageway 26 of the cassette shell 12 as observed from the film passage mouth. The light trapping fabric 28 consists of upper and lower fabric pieces 28a and 28b attached each to the upper and lower surfaces of the film passageway 26. The tips of the pile threads of each of the fabric pieces 28a and 28b actually project among the pile threads of the opposing fabric piece, although the fabric pieces 28a and 28b are shown separate at the center of the film passageway 26 to facilitate understanding of this structure. The ridge 22 is extended to locate a lower end 22a of the ridge 22 at the innermost position of the film passageway 26, and an upper end 22b of the ridge 22 at the middle of the film passageway 26 outside its innermost position. The upper ridge end 22b is formed to contact the upper surface of the film 14 so as to guide the film 14 to the middle between the fabric pieces 28a and 28b when the film 14 is advanced.

Figure 4:
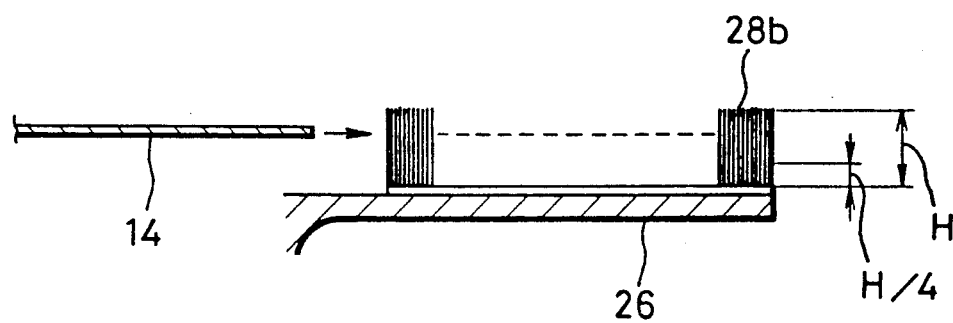
FIG. 4 is an explanatory view of the operation of the film cassette of FIG. 1.

In order to advance the film 14 smoothly through the film passageway 26, it is preferable to determine the degree of projection of the upper ridge end 22b such that the film 14 advances against the lower fabric piece 28b at a position more than ¼ of the length H of the pile threads with reference to the upper surface of the ground fabric of the lower fabric piece 28b, as shown in FIG. 4. This is because an advancement position greater than H/4 can reduce to a comparable extent the resistance received by the film 14 upon advancing against the light trapping fabric 28. The ridge 24 has the same construction as the ridge 22 described as above.

The operation of the embodiment constructed in this manner now will be described. When the spool shaft 16a is rotated to advance the film 14 initially, the ridges 22 and 24 guide the leading end 14a to be close to the position of lapping the pile threads of the fabric pieces 28a and 28b. The film 14 thus is advanced smoothly through the light trapping fabric 28.

Figure 6:
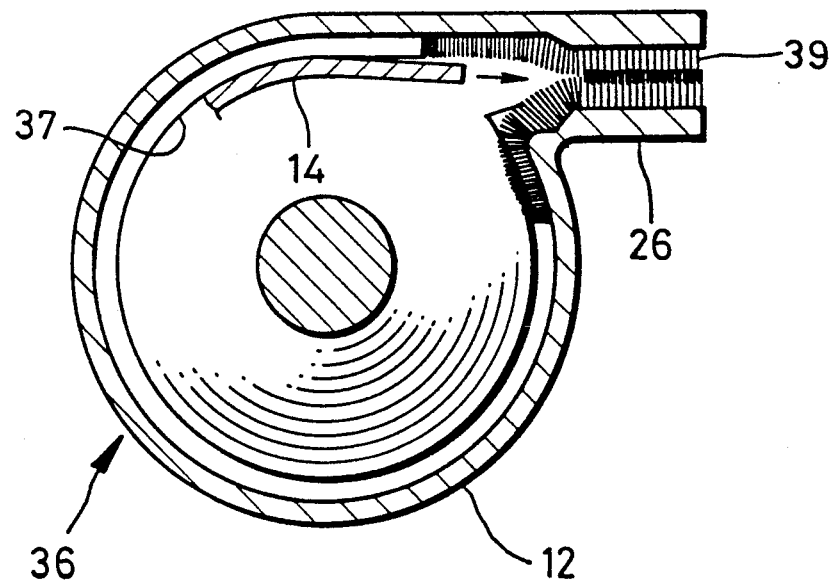
Figure 7:
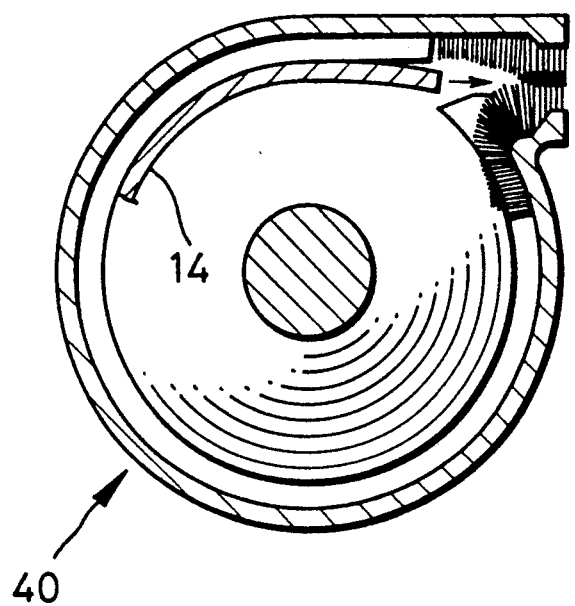

Other embodiments shown in FIGS. 5 to 8 for advancing the film smoothly through the film passageway now will be described. In a film cassette 32 shown in FIG. 5, an upper end of a ridge 33 is elongated until the innermost position of the film passageway 26. An upper fabric piece of a light trapping fabric 35 also is elongated in a direction toward the inside of the cassette shell 12 to be in contact with the upper end of the ridge 33. In FIG. 6, a film cassette 36 has a ridge 37 which is the same as in a conventional film cassette, such that its upper end is retracted internally from the innermost position of the film passageway 26. The upper fabric piece of a light trapping fabric 39 is elongated considerably in a direction toward the inside of the cassette shell 12 so as to contact the upper end of the ridge 37. A film cassette 40 shown in FIG. 7 is the same as the film cassette 36 in FIG. 6, except that the film passageway 26 is shorter.

Figure 5:
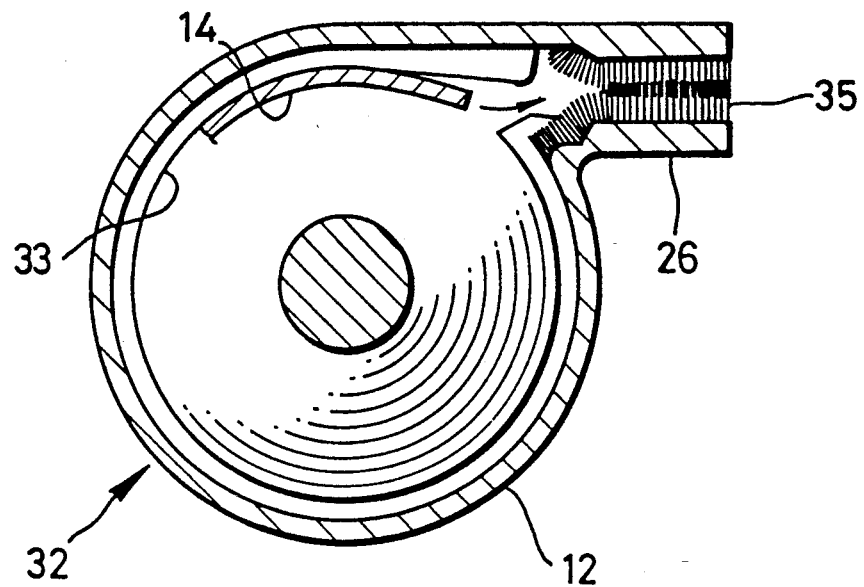
FIGS. 5 to 8 are sectional views of other embodiments of film cassettes for advancing the film smoothly through a film passageway.
Figure 8:
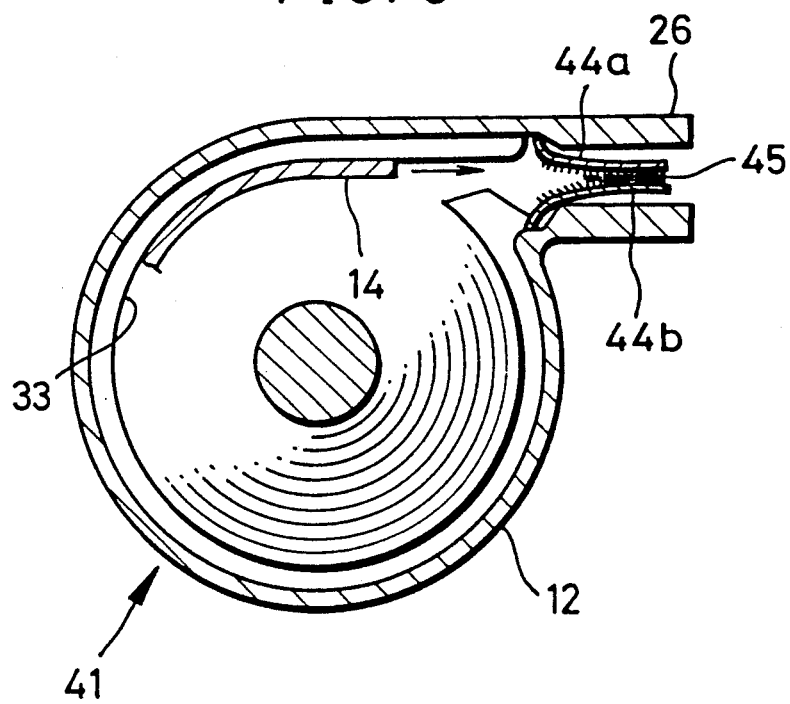

A film cassette 41 shown in FIG. 8 has the same ridge 33 as the film cassette 32 in FIG. 5, and light trapping resilient members 44a and 44b disposed on the upper and lower surfaces of the film passageway 26. Short pile threads 45 are planted on the surfaces of the resilient members 44a and 44b by a static charge. In the film cassette 41 constructed in this manner, during advancement the film 14 is held between the resilient members 44a and 44b with an appropriate force based on their resilience. Even in contact with the resilient members 44a and 44b, the leading end 14a of the film 14 is guided to the outside of the film passageway 26 by the resilience of the resilient members 44a and 44b.

The film cassettes shown in FIGS. 1 to 8 are 135 type cassettes which are widely used. Because the above-described light trapping fabric can pass the film smoothly therethrough with a reliable light-trapping function, it is effective to apply it to a self-advancing film cassette to advance a film leader through a film passageway by rotating the spool. The resistance of light trapping fabric must be as small as possible in a self-advancing film cassette before the film leader can be advanced from the film passageway.

FIGS. 9 to 14 show embodiments of self-advancing film cassettes with such light trapping fabric attached to a film passageway as is the main part of the present invention. Elements in these drawings which are substantially similar are designated by the same reference numerals.

Figure 9:
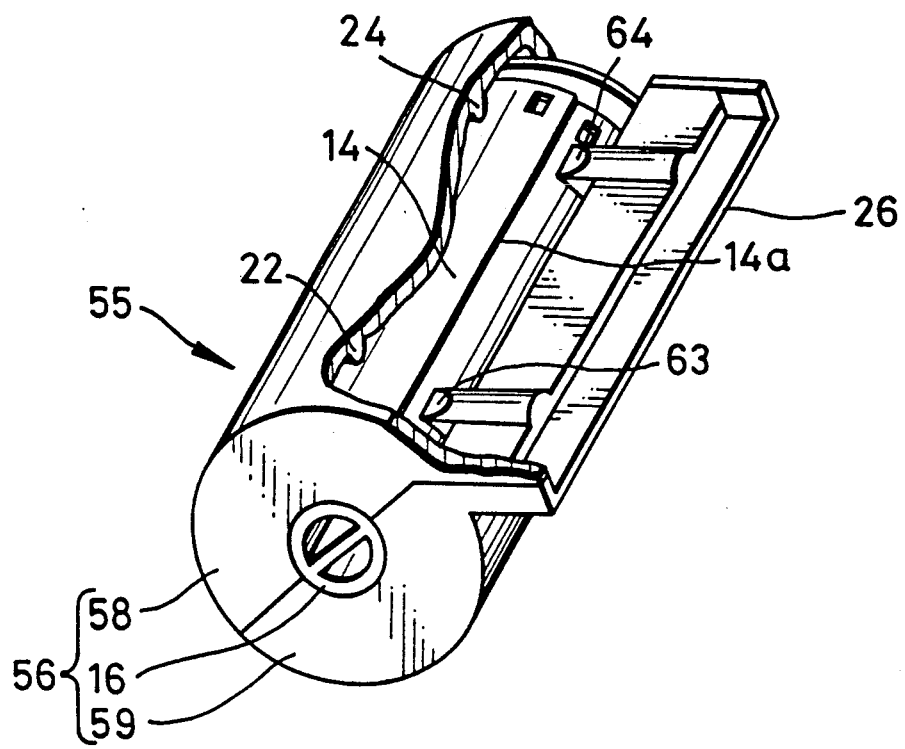
FIG. 9 is a perspective view, partially cutaway, of a self-advancing film cassette.

In FIG. 9, a self-advancing film cassette 55 has two annular ridges 22 and 24 formed in an inner surface of a cassette shell for receiving film wound in a roll in order to transmit rotation of a spool reliably to the film roll. The film cassette 55 consists of the cassette body 56 and the film 14 contained therein in a coiled state. The cassette body 56 includes two shell halves 58 and 59, and a spool 16 rotatably contained therein. The shell halves 58 and 59, which are made of plastic, are attached together to contain the spool 16 with the film 14 coiled thereabout. The ridges 22 and 24 are formed integrally with the shell halves 58 and 59 on the inner surface along the circumferential direction. The ridges 22 and 24 contact the outermost turn of the film 14 to prevent the film roll from loosening. The ridges 22 and 24 have separation claws 63 and 64 for separating the leading end 14a of the film 14 from the film roll.

In the self-advancing film cassette 55, the film roll is rotated together with the spool 16 when the spool 16 is rotated in the unwinding direction. The film leading end 14a is separated by the separation claws 63 and 64 and advanced to the outside of the cassette body 56 through the film passageway 26. It is noted that light trapping fabric as described above is attached to the film passageway 26, though not shown in FIG. 9.

Figure 10:
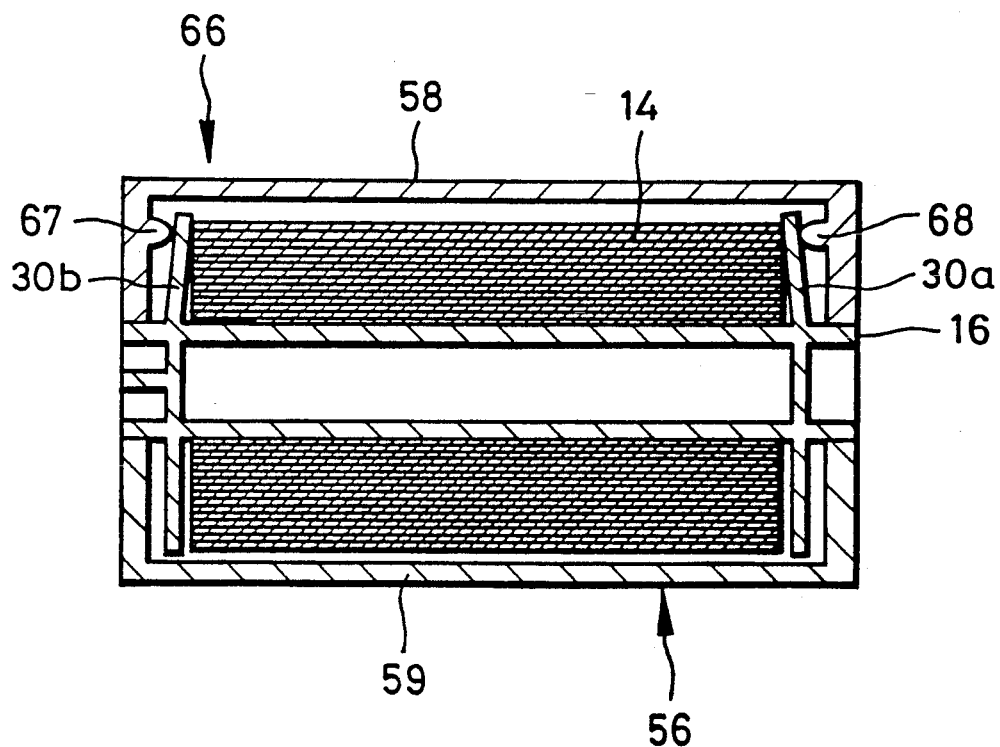
FIGS. 10 to 12 are sectional views of other embodiments of self-advancing film cassettes.

A self-advancing film cassette 66 shown in FIG. 10 has a pair of flanges of a spool for nipping the film roll so as to transmit rotation of the spool reliably to the film roll. A pair of arcuate ridges 67 and 68 are formed integrally with the shell half 58 on both opposite inner sides thereof. The ridges 67 and 68 abut respectively the flanges 30b and 30a of the spool 16 to bend them inwardly. The deformed flanges 67 and 68 support both end faces of the film roll to clamp the film 14. The rotation of the spool 16 thus is transmitted to the film roll to cause the leading end 14a to protrude from the cassette body 56.

Figure 11:
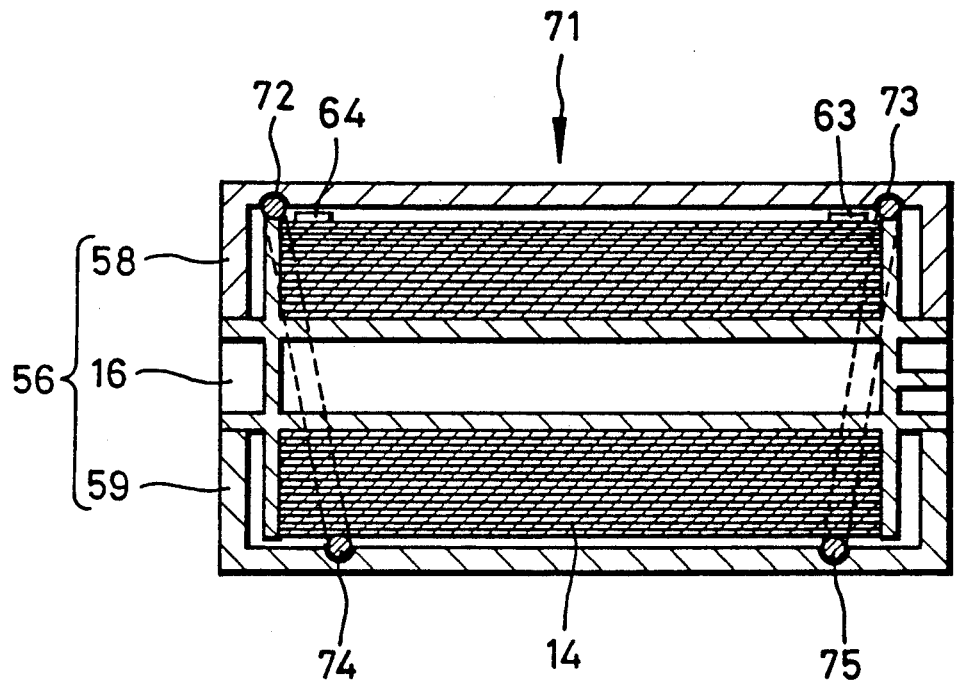

A self-advancing film cassette 71 shown in FIG. 11 has two rings for preventing a film roll from loosening. A pair of grooves 72 and 73 are formed on the inner surfaces of the shell halves 58 and 59 obliquely relative to a direction vertical to the spool 16. Rings 74 and 75 are inserted rotatably in the grooves 72 and 73 for abutting and pressing the outermost turn of the film roll in order to prevent the film 14 from loosening. When the rotation of the spool 16 causes the leading end 14a to move upwardly in FIG. 11, then the leading end 14a is released from the press of the rings 74 and 75 because the upper interval between the rings 74 and 75 is wider than the width of the film 14. The leading end 14a is separated from the outermost turn of the film roll by separation claws 63 and 64 and directed to the outside of the film passageway 26.

Figure 12:
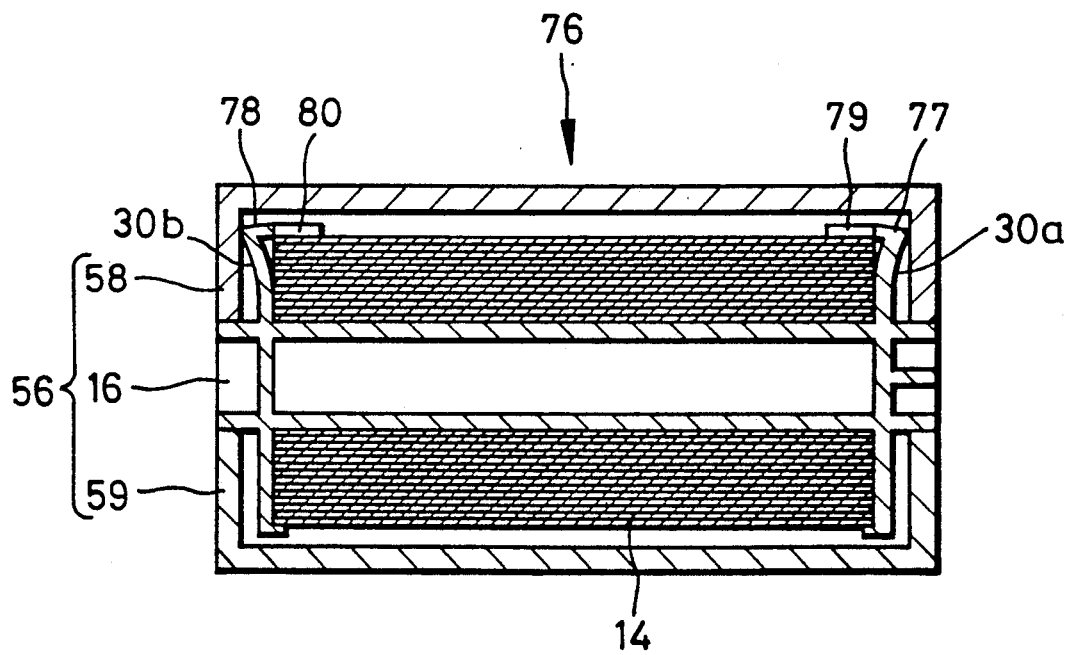

A self-advancing film cassette 76 shown in FIG. 12 has rims 77 and 78 projecting inwardly along the peripheral edges of the flanges 30a and 30b. The rims 77 and 78 abut and position the edge of the outermost turn of the film roll to prevent the film 14 from loosening. The rims 77 and 78 partly abut the sides of the separation claws 79 and 80 so as to be bent outwardly. The film roll is released from the rims 77 and 78 at a position close to the film passageway 26. The leading end 14a thus is separated from the film roll by the separation claws 79 and 80, and is advanced smoothly through the film passageway 26 without being hindered by the rims 77 and 78.

Figure 13:
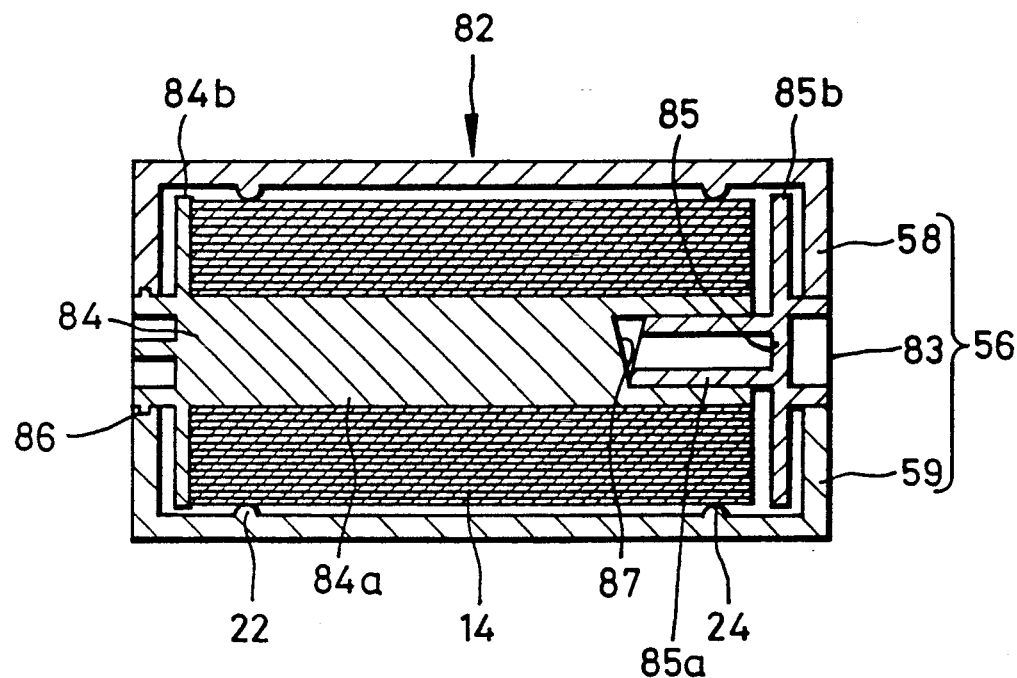
FIG. 13 is a sectional view of still another embodiment of a self-advancing film cassette, in which one of the flanges does not contact a film roll therebetween.
Figure 14:
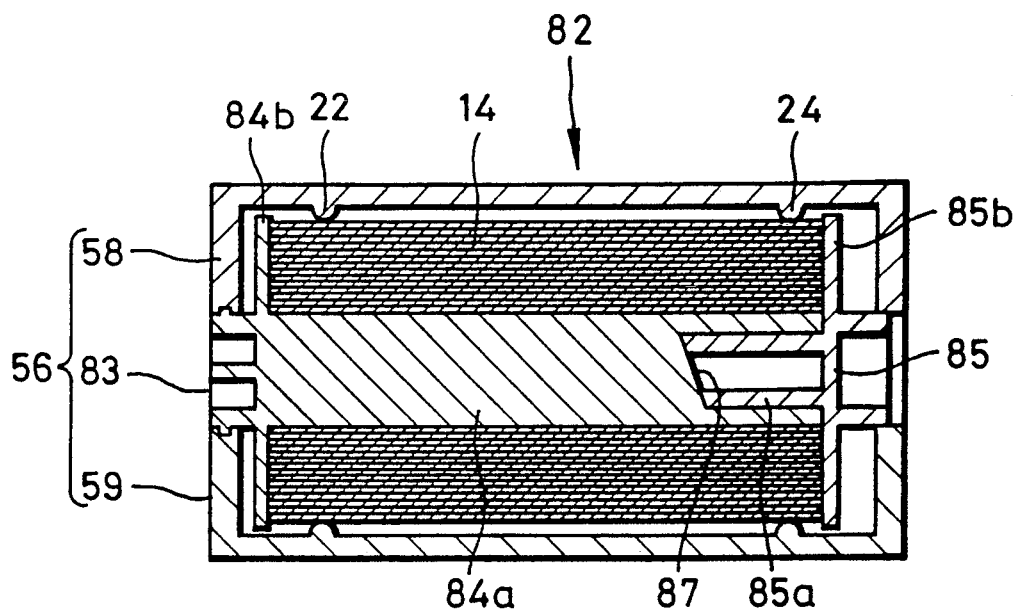
FIG. 14 is a view, similar to FIG. 13, of a state in which two flanges clamp the film roll.

A self-advancing film cassette 82 shown in FIGS. 13 and 14 has flanges which clamp the film roll during film advance, and are released from the film roll during winding of the film 14. A spool 83 consists of two spool pieces 84 and 85. A shaft 84a of the spool piece 84 has a cylindrical recess formed on the tip, in which a shaft 85a of the spool piece 85 is slidably fitted. A ridge 86 is formed on the shaft 84a thereabout and rotatably fitted in a circular groove formed on a shaft bearing of the shell halves 58 and 59. The bottom of the cylindrical recess of the shaft 84a has an inclined surface 87. The tip of the shaft 85a of the spool piece B5 also is inclined to be fitted on the inclined surface 87. The spool pieces 84 and 85 are provided with flanges 84b and 85b, each formed integrally therewith, for clamping both opposite sides of the film roll while advancing the film 14. In the same manner as in the embodiment shown in FIG. 9, the ridges 22 and 24 are formed on the shell halves 58 and 59 for receiving the outermost turn of the film roll in order to prevent the film roll from loosening.

When the spool piece 84 is rotated in the unwinding direction, the spool piece 85 is slid immediately to the spool piece 84 according to a cam mechanism (not shown) for linking the spool pieces 84 and 85. The film roll is clamped between both flanges 84b and 85b as shown in FIG. 14. The spool pieces 84 and 85 are rotated together so as to rotate the film roll integrally without loosening. The leading end 14a is advanced reliably outside the cassette body 56 through the film passageway 26. Upon rotating the spool piece 84 while rewinding the film 14, the cam mechanism slides the spool piece 85 outwardly to increase the distance between the flanges 84b and 85b. This distance becomes larger than the width of the film 14, so that the film 14 can be rewound on the shaft 84a.

The results of experiments regarding the foregoing embodiments now will be described. The experiments were conducted on the torque applied to the spool shaft 16a upon entering the leading end 14a in the film passageway while rotating the spool shaft 16a from a state with the leading end 14a of the film wound completely in the cassette body 12. The applied torque was measured by a torquemeter to determine the resistance applied to the film 14.

The maximum torque applied to the spool shaft 16a was 135 g·cm in the embodiment of FIG. 2, 155 g·cm in that of FIG. 5, 150 g·cm in that of FIG. 6, 145 g·cm in that of FIG. 7, and 132 g·cm in that of FIG. 8. Because it has been known from prior experiments that the film 14 can be advanced smoothly when the torque applied to the spool shaft 16a is below 200 g·cm, the results of the above experiments show that the film 14 can be advanced smoothly from the film cassettes according to the present invention.

An experiment also was conducted on a film cassette in which the leading end 14a is to abut the pile threads of the lower fabric piece at a height less than H/r with reference to the surface of the ground fabric of the lower fabric piece. However, in such a film cassette, the applied torque was more than 200 g·cm. Sometimes the film was bent and failed to advance.

Figure 15:
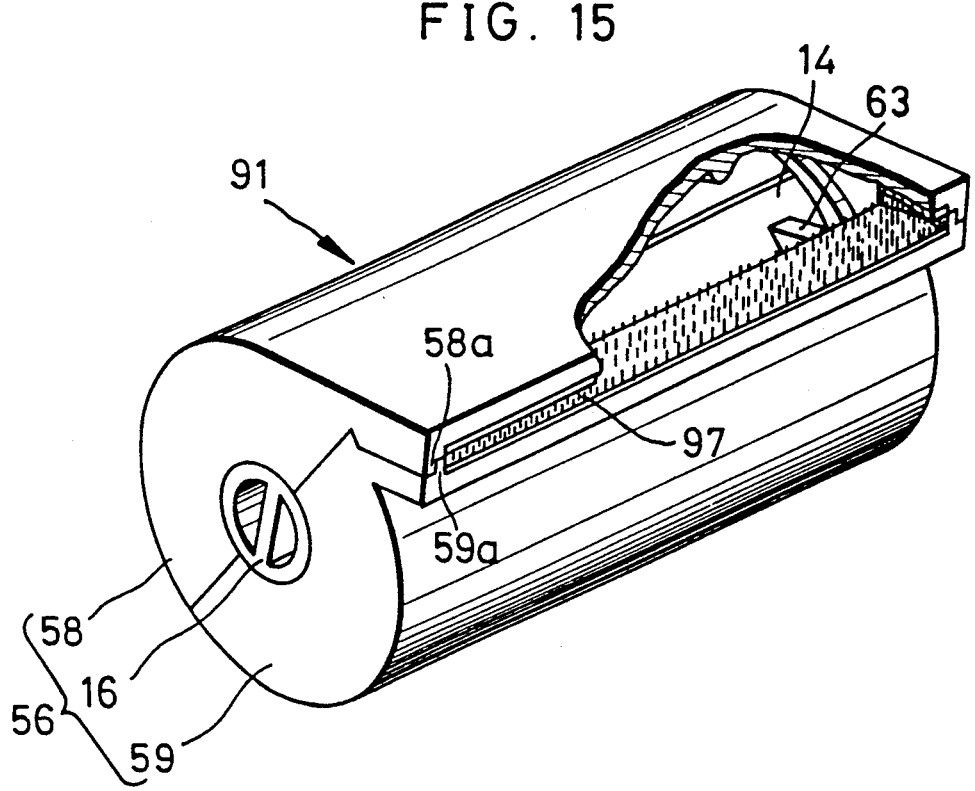
FIG. 15 is a perspective view of a film cassette according to another embodiment for shielding the film from light which light trapping fabric fails to trap.
Figure 16:
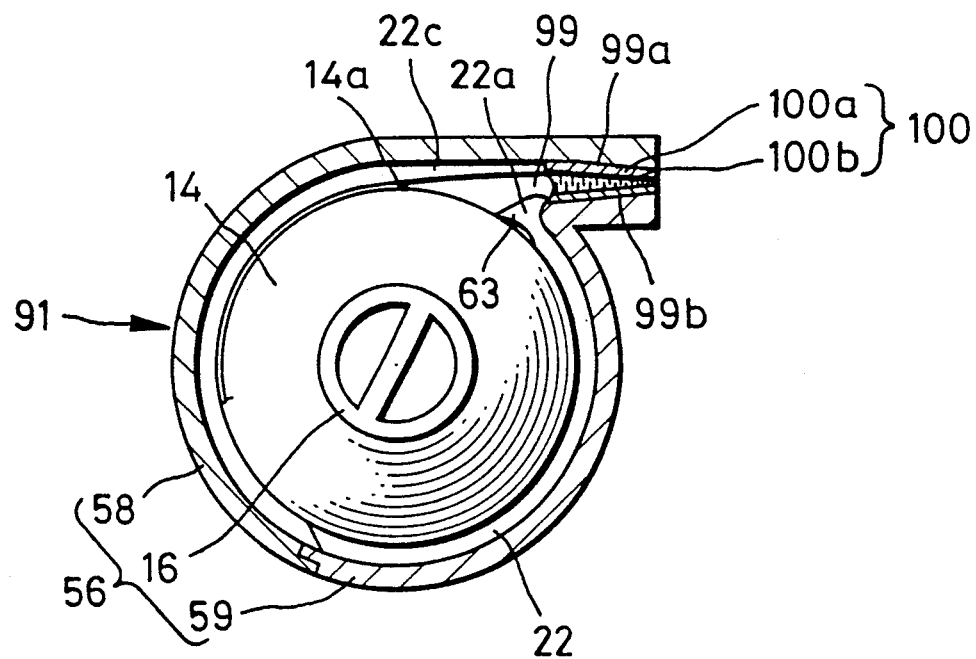
FIG. 16 is a sectional view of the film cassette of FIG. 15.

In FIGS. 15 and 16 showing a film cassette 91 according to an embodiment for shielding the film from the light which would pass through the light trapping fabric, elements which are the same as those shown in FIG. 9 are designated by the same reference numerals. The edges of the shell halves 58 and 59 to be joined are stepped edges 58a and 59a for preventing light from entering the inside of the cassette body 56 through the juncture between the shell halves 58 and 59.

The circumference of the cassette body 56 is provided with a film passage mouth 97, inside which a film passageway 99 is formed for directing the film 14 to the film passage mouth 97. The upper and lower surfaces of the film passageway 99 are inclined surfaces 99a and 99b between which the interval is narrower at the film passage mouth 97 than in the inside. Light trapping fabric 100, having ground fabric 100a and pile threads 100b, is attached on each of the inclined surfaces 99a and 99b. At the film passage mouth 97, the tips of the pile threads 100b on each surface of the film passageway 99 touch the ground fabric 100a across the film passageway 99.

Both annular ridges formed on the cassette body 56 presents the film 14 from loosening. Both ends of the ridge 22 are ridge ends 22a and 22c for guiding the leading end 14a to the film passageway 99. The separation claw 63 is formed on the ridge end 22a with its tip directed to the inside of the cassette body 56 in order to separate the leading end 14a from the outermost turn of the film 14. In contact with the separation claw 63 while rotating the spool 16 in the unwinding direction, the leading end 14a is separated from the outermost turn of the film 14, and is guided to a position between upper and lower fabric pieces of the light trapping fabric 100 by the ridge ends 22a and 22c . The leading end 14a, having been passed through the upper and lower fabric pieces, is advanced outside the cassette body 56 through the film passage mouth 97.

In the film cassette 91 constructed in this fashion, the tips of the pile threads 100b on each surface of the film passageway 99 touch the ground fabric 100a across the film passageway 99. The gaps between the bottoms or roots of the pile threads 100b on each side are filled with the tips of the pile threads 100b of the fabric piece on the opposite side so as reliably to prevent external light from passing through the bottoms of the pile threads 100b. The inside of the cassette body 56 is shielded completely from external light, thus preventing fogging on the film 14.

The leading end 14a passes through the ground fabric 100a while pushing the pile threads 100b. If the pile threads 100b were to be planted densely, the film 14 would not be advanced smoothly against greater friction in contact between the film 14 and the light trapping fabric 100. In the present film cassette 91, however, the tips of the densely formed pile threads 100b close to the film passage mouth 97 are pushed out of the cassette body 56 while advancing the film 14, and are moved to a wider space through the ground fabric 100a while rewinding the film 14. Therefore, the friction between the film 14 and the light trapping fabric 100 never will be enlarged along the film passageway 99. The film 14 can be advanced smoothly. Various materials can be used as the light trapping fabric 100: pile fabrics such as velvet and plush; knitted fabrics having pile threads; and pile-fitted materials.

Figure 17:
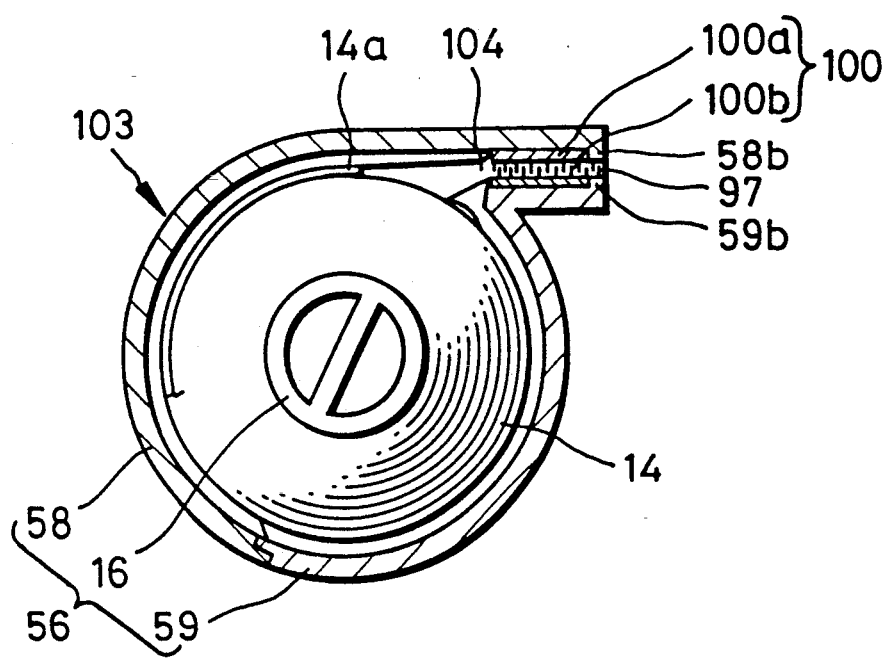
FIG. 17 is a sectional view of a film cassette according to another embodiment.

FIG. 17 shows a film cassette 103 according to another preferred embodiment of the present invention, in which projecting edges 58b and 59b formed on the shell halves 58 and 59 define stepped portions which make the interval of the film passage mouth 97 narrower than the width of a film passageway 104. The projecting degree of the projecting edges 58b and 59b is determined so as to project by a length of approximately ¼ of the length of the pile threads 100b over the surfaces of the ground fabric 100a. The projecting edges 58b and 59b act as stiffeners to prevent the film passage mouth 97 from being deformed.

In the film cassette 103 constructed in this fashion, the projecting edges 58b and 59b shield the film passageway 104 from parallel impinging external light entered through the bottoms of the pile threads 100b. The pile threads 100b completely shield parallel impinging external light directed to the film passageway 104 through the film passage mouth 97. No fogging develops on the film 14 because the inside of the cassette body 56 is shielded reliably from the outside. Even when the leading end 14a is advanced between the projecting edges 58b and 59b, the film 14 is kept from being damaged under protection of the pile threads 100b pushed by the leading end 14a.

Figure 18:
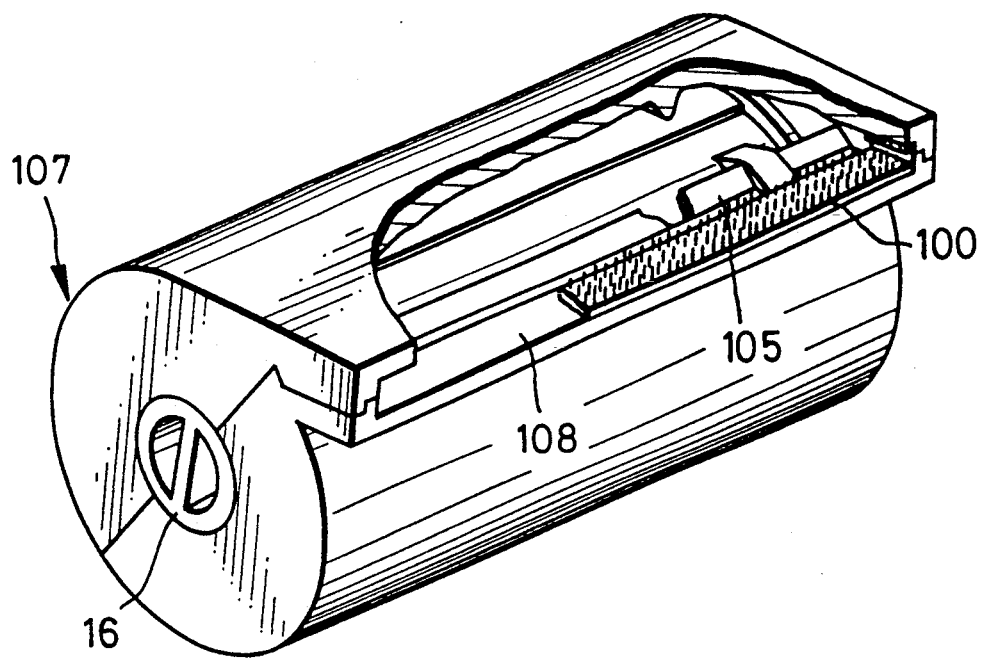
FIG. 18 is a partially cutaway perspective view of a film cassette according to a further embodiment.
Figure 19:
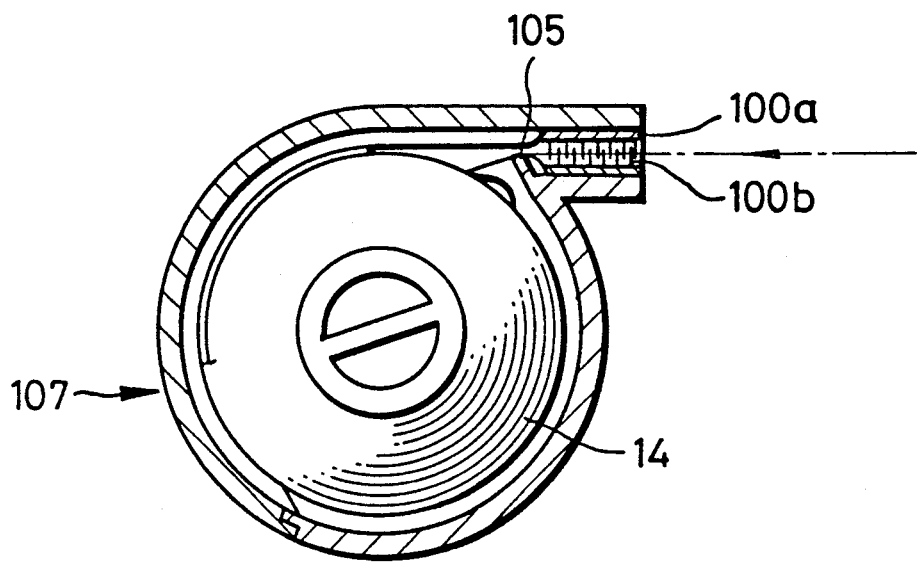
FIG. 19 is a sectional view of the film cassette of FIG. 18.

FIGS. 18 and 19 show a film cassette 107 according to a further preferred embodiment, in which the film cassette 107 has a light shielding member 105 formed at the innermost position of a film passageway 108 parallel to the spool 16. The fogging of the film 14 might have been caused on a part of the film roll close to the innermost position of the film passageway 99, but can be reduced greatly in the film cassette 107 constructed this way, because the light shielding member 105 shields the film 14 from external light directed to the outermost turn of the film roll upon passing through the bottoms of the pile threads 100b on the lower side of the film passageway 108.

Figure 20:
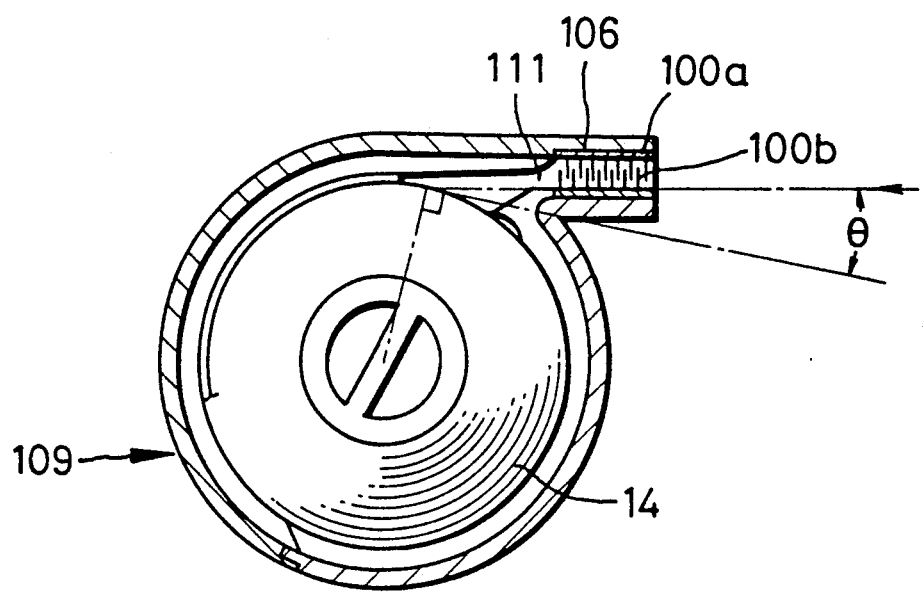
FIG. 20 is a sectional view of a film cassette according to yet another embodiment.
Figure 29:
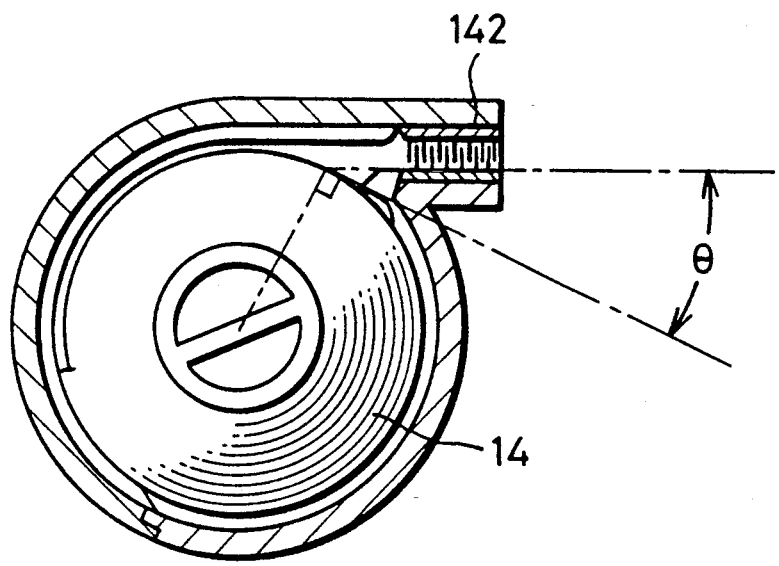
FIG. 29 is a sectional view of the film cassette of FIG. 28.

FIG. 20 shows a film cassette 109 according to yet another embodiment, in which the upper surface of a film passageway is provided with a recess 106 formed thereon, where the upper piece of the light trapping fabric 100 is attached so that the ground fabric 100a is fitted in the recess 106. The construction of the film passageway 111 for retracting the upper fabric piece upwardly therefrom makes it possible to keep the interval of both sides of the ground fabric 100a the same as in a conventional film cassette, and also makes it possible to form the lower surface of the film passageway 111 in an upper position by a length corresponding to the thickness of the ground fabric 100a relative to a conventional film cassette. In the film cassette 109 constructed in this manner, the light passed through the bottoms of the pile threads 100b on the lower side is incident on the outermost turn of the film 14 in a position that is higher than the film cassette shown in FIG. 29 by a length corresponding to the depth of the recess 106. The light impinges on the film 14 at a smaller angle θ to the tangent of the outermost turn of the film 14, so that fogging will be reduced on the film 14.

In the two embodiments shown in FIGS. 18 to 20 it is possible to reduce fogging on the film 14 further by enlarging the capacity of the antihalation coating of the film 14 to absorb light. Specifically, the conventional film includes an antihalation coating whose peak value of light absorbing capacity is approximately 0.8. If the peak value were 1.6, then the amount of light could be reduced to 1/10 after passing through the antihalation coating.

Figure 21:
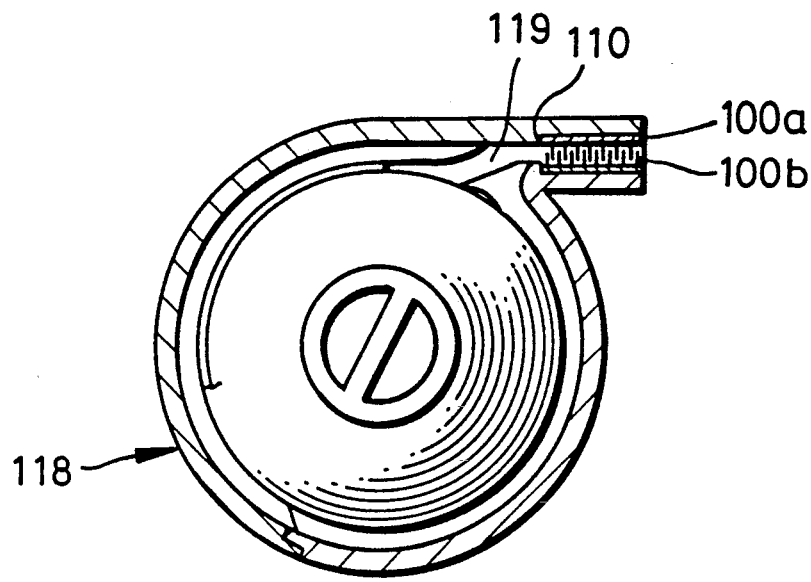
FIG. 21 is a sectional view of a film cassette according to a still further embodiment.

FIG. 21 shows a film cassette 118 according to a still further embodiment of the invention, in which a film passageway 119 of the film cassette 118 has two steps 110 on each of the upper and lower surfaces. The difference between the levels defined by the steps 110 is as long as the thickness of the ground fabric 100a plus ¼ of the length of the pile threads 100b, in order to shield the inside of the cassette body 56 from external light upon passing through the bottoms of the pile threads 100b.

Figure 22:
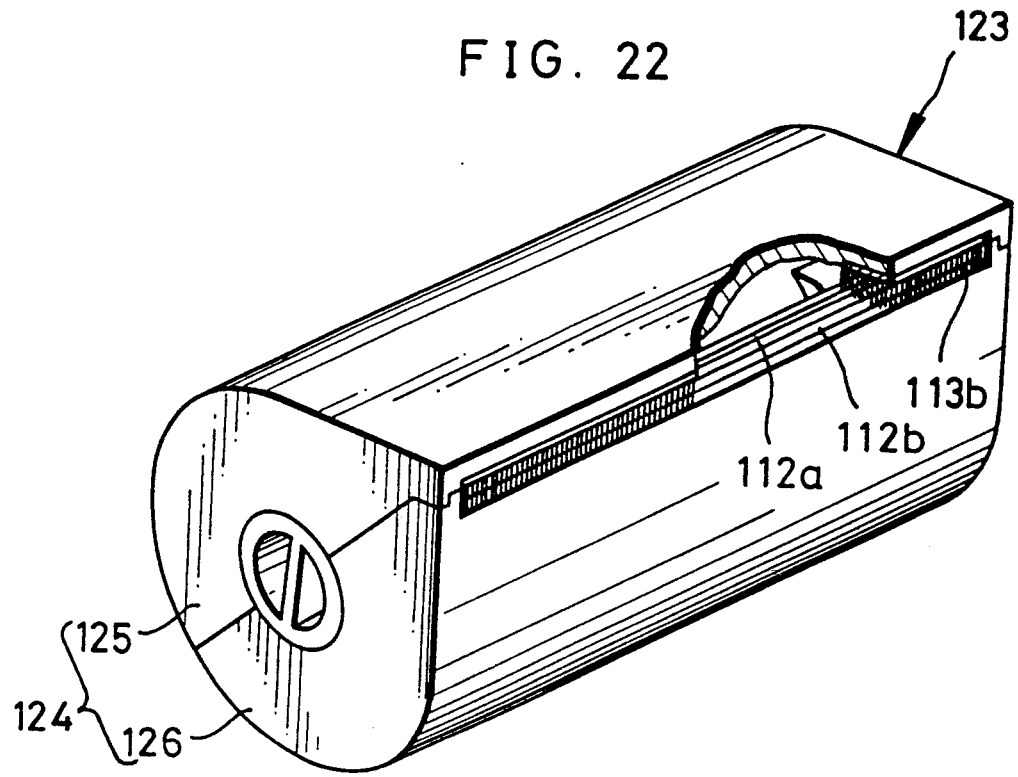
FIG. 22 is a perspective view, partially cutaway, of a variant form of the film cassette of FIG. 21.
Figure 23:
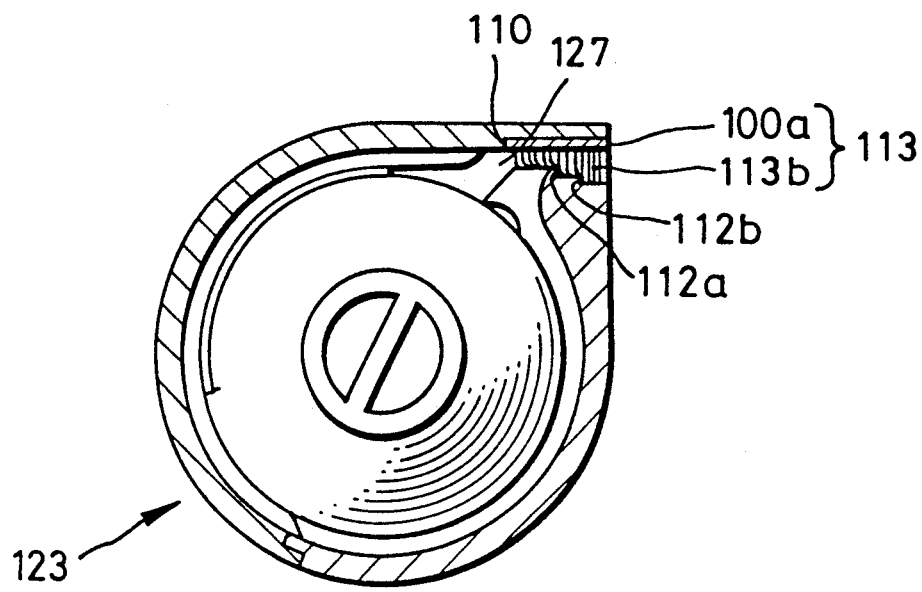
FIG. 23 is a sectional view of the film cassette of FIG. 22.

FIGS. 22 and 23 show a film cassette 123 according to another embodiment of the present invention, in which the film cassette 123 has a single fabric piece as light trapping fabric 113 for shielding a film passageway 127 from light. A cassette body 124 consisting of a pair of shell halves 125 and 126 is formed with a small diameter without a particular projection for the film passage mouth 97. The film passageway 127 has the step 110 formed on the upper surface, and two steps 112a and 112b formed on the lower surface. The light trapping fabric 113 attached to the upper side of the film passageway 127 consists of the ground fabric 100a and pile threads 113b which are longer than the above-described pile threads 100b. The tips of the pile threads 113b touch the lower surface of the film passageway 127 in the narrow inner positions, but do not touch it in the outer position outside the step 112b.

In the film cassette 123 constructed as just described, the external light passed through the bottoms of the pile threads 113b is prevented by the step 110 from entering the inside of the cassette body 124. On the lower side of the film passageway 127, the external light is prevented reliably by the pile threads 113b which are bent densely in the narrow inner space of the film passageway 127. It is noted that, although the pile threads 113b are dense in the narrow inner space of the film passageway 127, the force for advancing the film 14 does not need to be large in the film cassette 123 because the narrow inner space is short.

Figure 24:
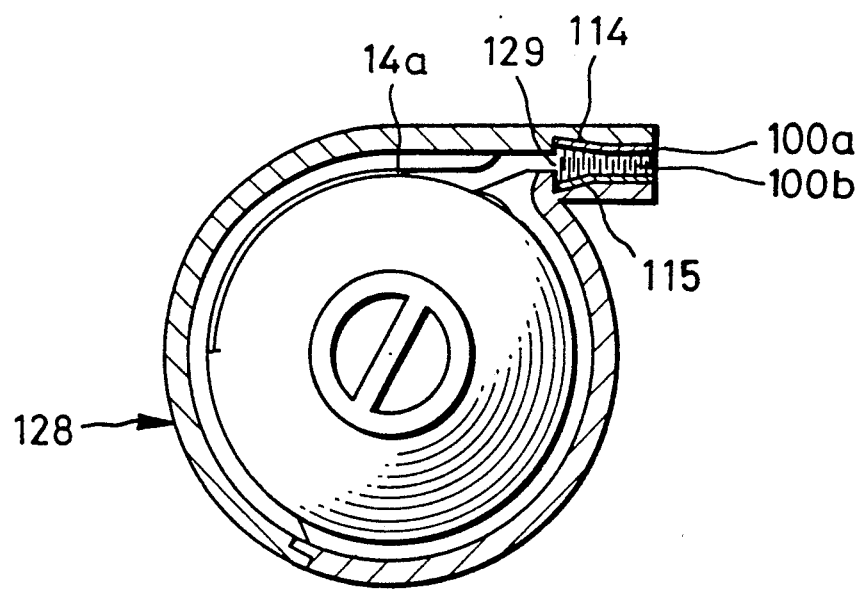
FIG. 24 is a sectional view of another variant of the film cassette of FIG. 21.

In FIG. 24, which shows a variant of the film cassette 118 shown in FIG. 21, a film passageway 129 of a film cassette 128 is provided with inclined surfaces 114 and 115 as its upper and lower surfaces for attaching the light trapping fabric 100 thereto. The inclined surfaces 114 and 115 has such an inclination that the width of the film passageway 129 increases in the direction toward the inside of the film cassette 128 until the steps formed on both inner surfaces. Therefore, the leading end 14a can be entered smoothly through the ground fabric 100a in the film cassette 128, as well as the bottoms of the pile threads 100b are reliably shielded from light at the film passage mouth 97.

Figure 25:
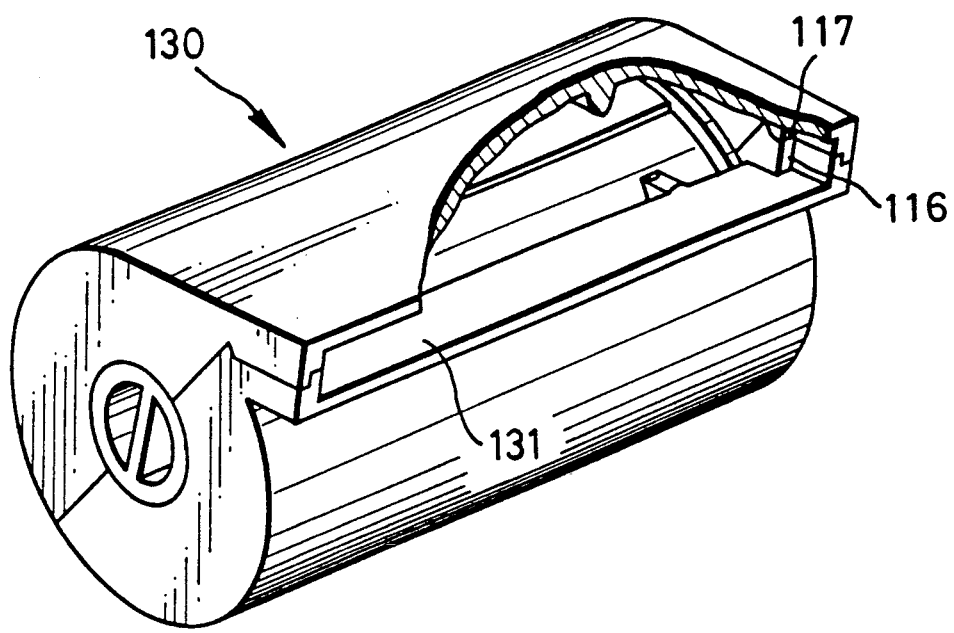
FIG. 25A is a perspective view, partially cutaway, of a film cassette according to a further embodiment.
FIG. 25B is an enlarged perspective view of an important portion of a variant of the film cassette of FIG. 25A.
Figure 25:
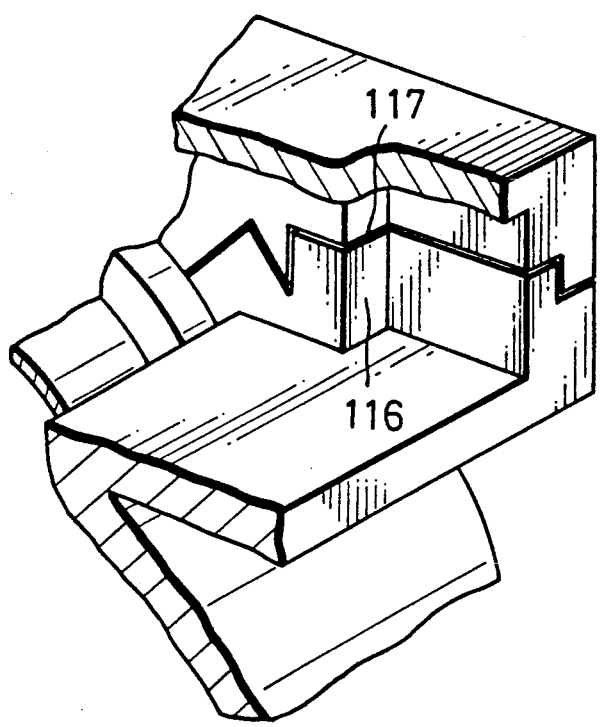
Figure 26:
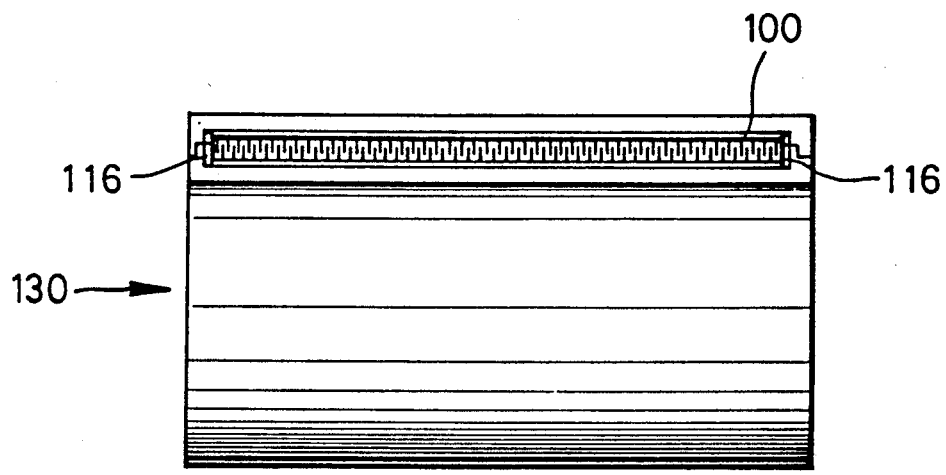
FIG. 26 is a front view of the film cassette of FIG. 25A.

FIGS. 25A and 26 show a film cassette 130 according to an additional preferred embodiment, in which a film passageway 131 of the film cassette 130 has a step 116 formed on each of both lateral walls in order to enlarge the lateral width of the film passageway at the film passage mouth 97. A juncture 117 between shell halves 58 and 59 traverses the step 116. In order to prevent light from entering the film cassette 130 through the juncture 117, the juncture 117 has a labyrinth construction constituted by lines forming angles. In the film cassette 130 constructed in this manner, the step 116 prevents outside light from entering the film cassette 130 through the gaps between the light trapping fabric 100 and both lateral walls of the film passageway 131, as shown in FIG. 26. As an alternative to the juncture 117 shown in FIG. 25A, the angularly formed juncture 117 also may be constructed such that a projection on the edge of the upper shell half 58 engages with a recess of the edge of the lower shell half 59, as shown in FIG. 25B.

Experiments were carried out on the fogging of film contained in the film cassettes as described with reference to FIGS. 15 to 26. The film cassettes, containing Fuji color Super HG 400 (merchandise name), were exposed to light of 100,000 lux for 3 minutes. The film was developed, and then was inspected visually to see whether fogging resulted. No fogging was detected in the film from any of the film cassettes.

Figure 27:
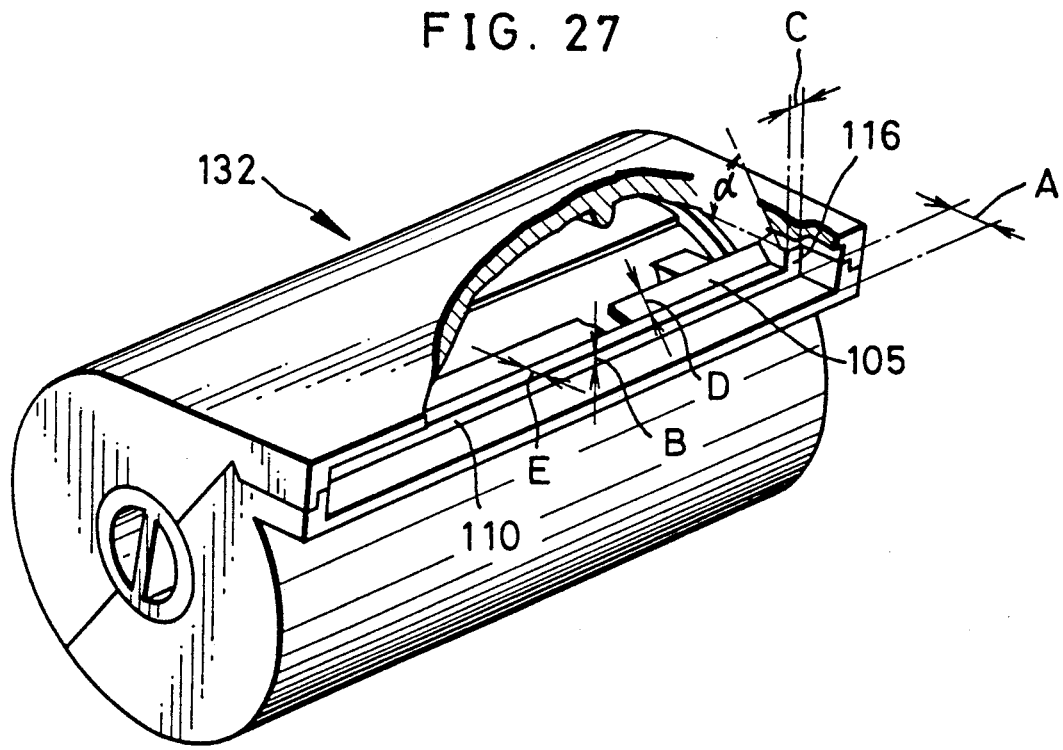
FIG. 27 is a perspective view of a film cassette which is a combination of the embodiments of FIGS. 18, 19, 21, 25A and 26.
Figure 28:
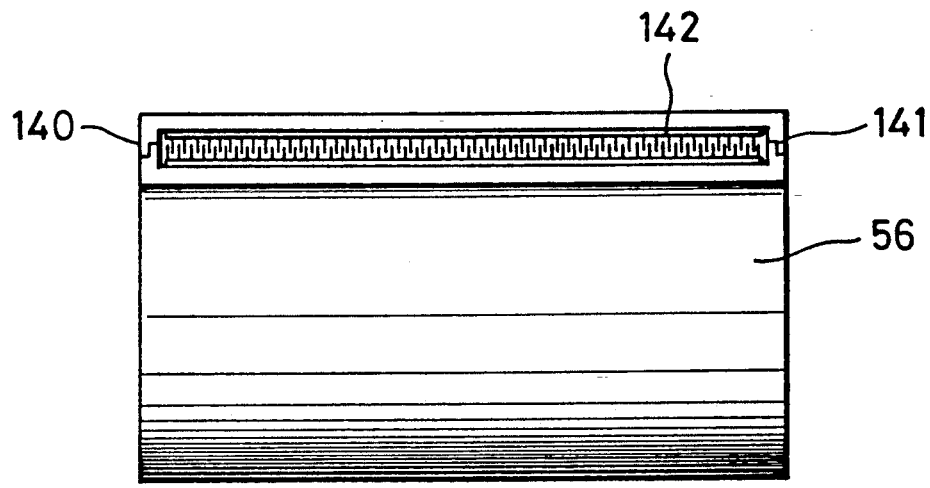
FIG. 28 is a front view of a conventional film cassette.

FIG. 27 shows a preferred film cassette 132 which is a combination of the constructions of the above embodiments, in which the film passageway of the film cassette 132 has two steps 110 on the upper and lower surfaces thereof (see FIG. 21), two steps 116 on both lateral walls (see FIG. 25A), and the light shielding member 105 on the innermost position close to the roll of film (see FIG. 18). The juncture traversing the steps 116 has a labyrinthian construction of lines forming angles. The light shielding structure thus constructed is preferably designed to have a fabric fitting portion outside the steps 110 having a width A of 5 mm, the steps 110 themselves having a height B of 1 mm; steps 116 having a height C of 1 mm; a light shielding portion 105 having a length D of 3 mm; an interval E between the lower of the steps 110 and the bottom of the light shielding member 105 of 1.5 mm; and an angle $\alpha$ of 30° along the juncture to be engaged.

In an experiment, the film cassette 132 containing the Fuji Color Super HG 400 mentioned above was exposed to light of 100,000 lux for 3 minutes. The film was developed, and then was inspected visually to see whether fogging occurred. No fogging was detected in the film from the film cassette 132.

Although the constructions for shielding the film from light have been described as applied to a film cassette for 35 mm roll film, these constructions may also be applied to various other plastic film cassettes such as a 110 cartridge and a film cassette, without a film advancement mechanism for rotating a spool to advance the film.

Further, the construction of any of the embodiments of the present invention may be applied not only to a film cassette which is loaded in a camera, but also may be applied to a container for containing any photographic film in the form of a filmstrip, e.g. film for computerized typesetting, light-sensitive resin film, and microfilm.

While the invention has been described in detail above with reference to a preferred embodiment, various modifications within the scope and spirit of the invention will be apparent to people of working skill in this technological filed. Thus, the invention should be considered as limited only by the scope of the appended claims.

What is claimed is:

1. A photographic film cassette for containing photographic film coiled on a spool in a cassette body in light-tight fashion, in which rotation of said spool causes a film leader to advance to the outside of a film passage mouth through a film passageway, said film cassette comprising:
   first and second light trapping members, provided on respective upper and lower surfaces of said film passageway, for trapping light; and
   means for guiding said film leader to be close to a predetermined position defined between said first and second light trapping members when said film leader passes between said first and second light trapping members, wherein said guiding means comprises a ridge-shaped portion extending to said film passageway from a ridge formed on an inner surface of said cassette body so as to prevent said film from loosening toward said film passage mouth along said upper surface.

2. A photographic film cassette as defined in claim 1, said first light trapping member comprising first fabric having first pile threads and said second light trapping member comprising second fabric having second pile threads, wherein said first fabric is disposed on an upper surface of said film passageway so as to contact an outside surface of said film when said film is in a coiled state, and said second fabric is disposed on a lower surface of said film passageway so as to contact an inside surface of said film when said film is in said coiled state.

3. A photographic film cassette as defined in claim 2, wherein an amount of projection of said ridge-shaped portion is determined such that said film leader advances against said second pile threads at a height greater than ¼ of a height of said second pile threads, said height of said second pile threads being determined with reference to bottoms thereof.

4. A photographic film cassette as defined in claim 2, further comprising steps, formed on lateral walls of said film passageway facing on lateral edges of said film, wherein said film passageway widens in the vicinity of said film passage mouth, so as to shield light incident on gaps between said lateral walls and said first and second fabrics.

5. A photographic film cassette for containing photographic film coiled on a spool in a cassette body in light-tight fashion, in which rotation of said spool causes a film leader to advance to the outside of a film passage mouth through a film passageway, said film cassette comprising:
   first and second light trapping members, provided on respective upper and lower surfaces of said film passageway, for trapping light, said first light trapping member comprising first fabric having first pile threads and said second light trapping member comprising second fabric having second pile threads, wherein said first fabric is disposed on an upper surface of said film passageway so as to contact an outside surface of said film when said film is in a coiled state, and said second fabric is disposed on a lower surfaces of said film passageway so as to contact an inside surface of said film when said film is in said coiled state; and
   means for guiding said film leader to be close to a predetermined position defined between said first and second light trapping members when said film leader passes between said first and second light trapping members, wherein said guiding means includes:
   a ridge-shaped portion extending from a ridge formed on an inner surface of said cassette body in order to prevent said film form loosening toward said film passage mouth up to an innermost position of said upper surface; and
   an extended fabric portion extending from said first fabric so as to contact an end of said ridge-shaped portion.

6. A photographic film cassette for containing photographic film coiled on a spool in a cassette body in light-tight fashion, in which rotation of said spool causes a film leader to advance to the outside of a film passage mouth through a film passageway, said film cassette comprising:

first and second light trapping members, provided on respective upper and lower surfaces of said film passageway, for trapping light, said first light trapping member comprising first fabric having first pile threads and said second light trapping member comprising second fabric having second pile threads, wherein said first fabric is disposed on an upper surface of said film passageway so as to contact an outside surface of said film when said film is in a coiled state, and said second fabric is disposed on a lower surfaces of said film passageway so as to contact an inside surface of said film when said film is in said coiled state; and means for guiding said film leader to be close to a predetermined position defined between said first and second light trapping members when said film leader passes between said first and second light trapping members, wherein said guiding means comprises an extended fabric portion extending from said first fabric so as to contact an end of a ridge formed on an inner surface of said cassette body in order to prevent said film from loosening.

7. A photographic film cassette for containing photographic film coiled on a spool in a cassette body in light-tight fashion, in which rotation of said spool causes a film leader to advance to the outside of a film passage mouth through a film passageway, said film cassette comprising:

first and second light trapping members, provided on respective upper and lower surfaces of said film passageway, for trapping light; and means for guiding said film leader to be close to a predetermined position defined between said first and second light trapping members when said film leader passes between said first and second light trapping members, wherein said guiding means comprises resilient members, disposed respectively on upper and lower surfaces of said film passageway, said resilient members being shaped so as to gradually come together in a direction toward the outside of said film passage mouth, and said first and second light trapping members comprise first and second pile threads, planted on a surface of each of said resilient members, respectively.

8. A photographic film cassette for containing photographic film coiled on a spool in a cassette body in light-tight fashion, wherein a rotation of said spool causes a film leader to advance outside of a film passage mouth through a film passageway, said film cassette comprising:

first and second fabrics, attached to respective upper and lower surfaces of said film passageway, and contacting outside and inside surfaces in a coiled state of said film, for trapping light; and a ridge-shaped portion extending into said film passageway from a ridge formed on an inner surface of said cassette body for preventing said film from loosening toward said film passage mouth along said upper surface, so as to guide said film leader to be close to a position defined between said first and second fabrics when said film leader passes between said first and second fabrics.

9. A photographic film cassette for containing photographic film coiled on a spool in a cassette body in light-tight fashion, in which rotation of said spool causes a film leader to advance outside of a film passage mouth through a film passageway, said film cassette comprising:

light trapping resilient members, disposed respectively on upper and lower surfaces of a rear portion of said film passageway and being shaped so that free ends of said light trapping resilient members gradually come together in a direction toward the outside of said film passage mouth, for guiding said film leader toward said film passage mouth; and pile threads, planted on a surface of each of said resilient members for trapping light.

10. A photographic film cassette for containing photographic film coiled on a spool in a cassette body in light-tight fashion, wherein said film is advanced to the outside through a film passage mouth, said film cassette comprising:

a film passageway, formed in said cassette body, for passing said film to said film passage mouth, said film passageway having respective upper and lower surfaces;

at least one fabric having pile threads, and attached to said film passageway, for trapping light;

wherein said upper and lower surfaces of said film passageway each have a flat surface portion, such that a width of said film passageway is constant, and an inclined surface portion, such that the width of said film passageway increases in a direction toward the inside of said cassette body, and further including steps formed therein between said inclined surface portions and said spool; and further comprising steps, formed on lateral walls of said film passageway facing on lateral edges of said film, such that said film passageway is widened in the vicinity of said film passage mouth in order to shield light incident on gaps between said lateral walls and said fabric.

* * * * *